US009952401B2

(12) United States Patent
Timmins et al.

(10) Patent No.: US 9,952,401 B2
(45) Date of Patent: Apr. 24, 2018

(54) INLINE SPLICING MODULE FOR EASY ACCESS TO CABLE SUBGROUPS

(71) Applicant: Optical Cable Corporation, Roanoke, VA (US)

(72) Inventors: Ian J. Timmins, Asheville, NC (US); Sumio Seo, Wallingford, VT (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 15/049,897

(22) Filed: Feb. 22, 2016

(65) Prior Publication Data

US 2016/0246024 A1 Aug. 25, 2016

Related U.S. Application Data

(60) Provisional application No. 62/118,705, filed on Feb. 20, 2015.

(51) Int. Cl.
*G02B 6/00* (2006.01)
*G02B 6/44* (2006.01)

(52) U.S. Cl.
CPC ......... *G02B 6/4455* (2013.01); *G02B 6/4452* (2013.01); *G02B 6/4457* (2013.01)

(58) Field of Classification Search
USPC ........................................................ 385/135
See application file for complete search history.

(56) References Cited

U.S. PATENT DOCUMENTS

| 5,093,885 A | 3/1992 | Anton | |
|---|---|---|---|
| 5,278,933 A | 1/1994 | Hunsinger et al. | |
| 5,450,518 A | 9/1995 | Burek et al. | |
| 2009/0097813 A1* | 4/2009 | Hill | G02B 6/4454 385/135 |
| 2009/0290842 A1* | 11/2009 | Bran de Leon | G02B 6/4455 385/135 |
| 2013/0315549 A1* | 11/2013 | Rudenick | G02B 6/4454 385/135 |

* cited by examiner

*Primary Examiner* — Eric Wong
(74) *Attorney, Agent, or Firm* — The Van Winkle Law Firm; William G. Heedy; David M. Carter (57) ABSTRACT

An inline splicing module for use in combination with one or more fiber subgroup cables each having a plurality of individual fibers includes a backplane component having top and bottom sides; at least one projection on the backplane component defining a cable slack storage component for securing the fiber subgroup cable in a storage position; at least one splice capturing component on the backplane component having a plurality of splice protector sleeves that are each sized and configured for securing therethrough a corresponding one of the plurality of individual fibers from one of the one or more fiber subgroup cables; and a plurality of fiber optic couplers each being structured and disposed for receipt of a corresponding one of the plurality of individual fibers.

17 Claims, 11 Drawing Sheets

INLINE SPLICING MODULE FOR EASY ACCESS TO CABLE SUBGROUPS

This application is based on and claims priority to provisional patent application No. 62/118,705 filed on Feb. 20, 2015.

BACKGROUND OF THE INVENTION

Field of the Invention

This invention relates to fiber optic cable management and, more particularly, to an inline splicing module for storing and accessing fiber optic transmission lines.

Discussion of the Related Art

Increased usage of fiber optic cabling between one or more locations in large on-site environments, such as college campuses, wherein the locations may be within close proximity of each other, has required improved efficiency in fiber optic cable management.

Therefore, with the foregoing reasons in mind, there exists a need for a combined fiber optic cabling and connectivity system to provide for easy installation and accessibility of the associated fiber optic transmission lines to allow for usage and reconfiguration for various communication protocols and connector types.

SUMMARY OF THE INVENTION

In accordance with one form of the present invention, there is provided an inline splicing module for use in combination with one or more fiber subgroup cables each including a plurality of individual fibers, the inline splicing module including a backplane component having top and bottom sides; at least one projection on the backplane component defining a cable slack storage component for securing the fiber subgroup cable in a storage position; at least one splice tray including a cabinet structure selectively operable between an open configuration and a closed configuration and a splice capturing component having a plurality of splice protector sleeves that are each sized and configured for securing therethrough a corresponding one of the plurality of individual fibers from one of the one or more fiber subgroup cables, and wherein the plurality of splice protector sleeves are tightly grouped together; the backplane component being structured and disposed for selectively securing one of each of the at least one splice trays on each of the top and bottom sides of the backplane component; and a coupler plate on the backplane component including a plurality of fiber optic couplers each being structured and disposed for receipt of a corresponding one of the plurality of individual fibers.

In accordance with another form of the present invention, there is provided an inline splicing module for use in combination with one or more fiber subgroup cables each including a plurality of individual fibers, the inline splicing module including a backplane component having top and bottom sides; at least one projection on the backplane component defining a cable slack storage component for securing the fiber subgroup cable in a storage position; at least one splice tray including a splice capturing component having a plurality of splice protector sleeves that are each sized and configured for securing therethrough a corresponding one of the plurality of individual fibers from one of the one or more fiber subgroup cables, and wherein the plurality of splice protector sleeves are tightly grouped together; the backplane component being structured and disposed for selectively securing one of each of the at least one splice trays on each of the top and bottom sides of the backplane component; and a coupler plate on the backplane component including a plurality of fiber optic couplers each being structured and disposed for receipt of a corresponding one of the plurality of individual fibers.

In accordance with another form of the present invention, there is provided an inline splicing module for use in combination with one or more fiber subgroup cables each including a plurality of individual fibers, the inline splicing module including a backplane component having top and bottom sides; at least one projection on the backplane component defining a cable slack storage component for securing the fiber subgroup cable in a storage position; at least one splice capturing component on the backplane component having a plurality of splice protector sleeves that are each sized and configured for securing therethrough a corresponding one of the plurality of individual fibers from one of the one or more fiber subgroup cables; and a plurality of fiber optic couplers each being structured and disposed for receipt of a corresponding one of the plurality of individual fibers.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION OF THE PREFERRED EMBODIMENT

Referring to the several views of the drawings, the inline splicing module of the present invention for accessing cable subgroups is shown and is generally indicated as 10.

Figure 1:
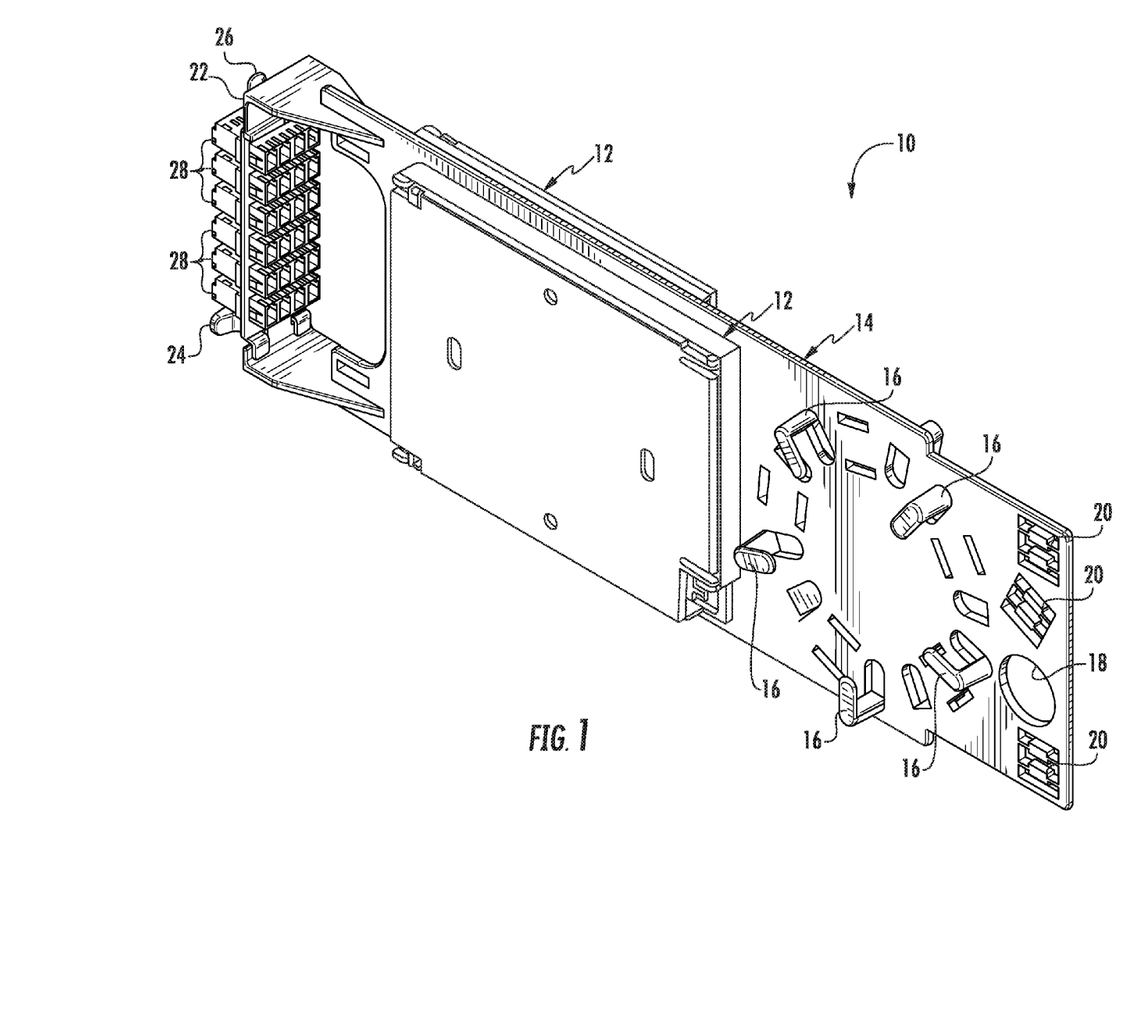
FIG. 1 is a perspective view of the inline splicing module of the present invention in accordance with one embodiment.
Figure 2:
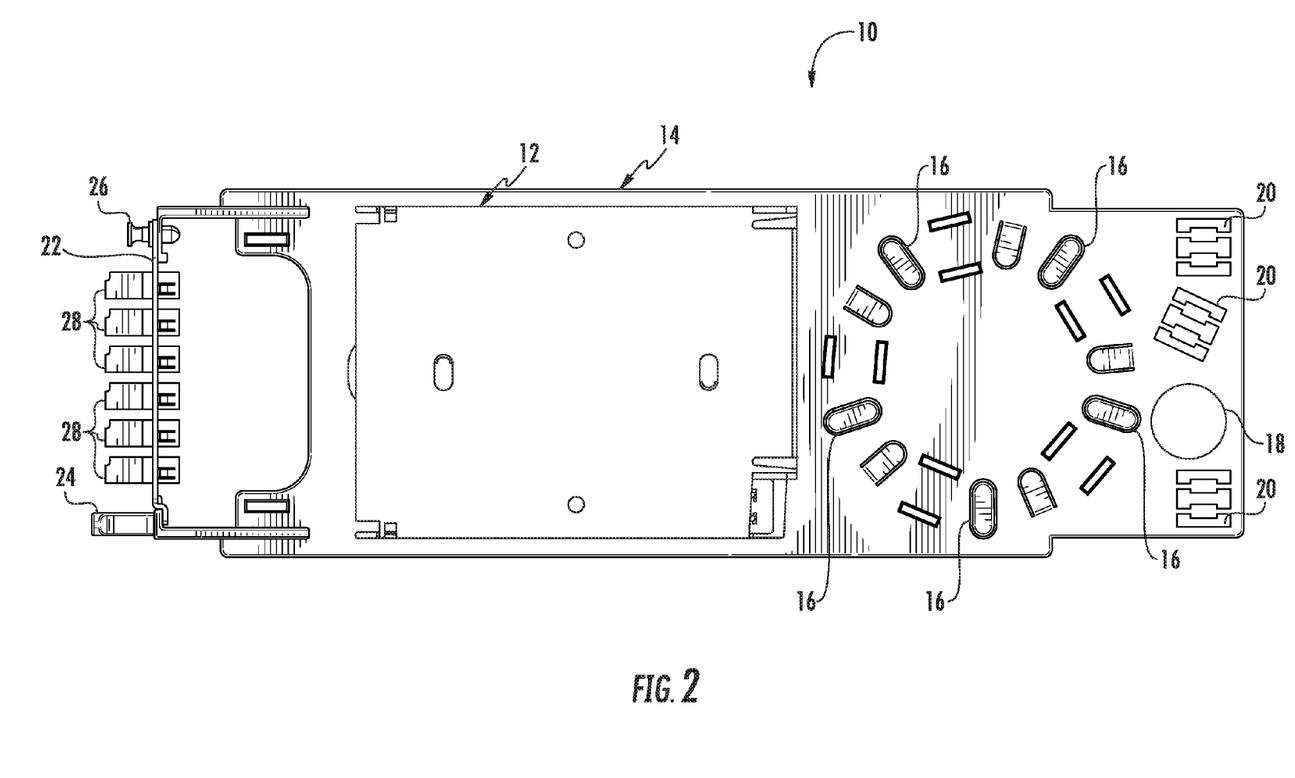
FIG. 2 is a top plan view of the inline splicing module of the present invention in accordance with one embodiment.
Figure 3:
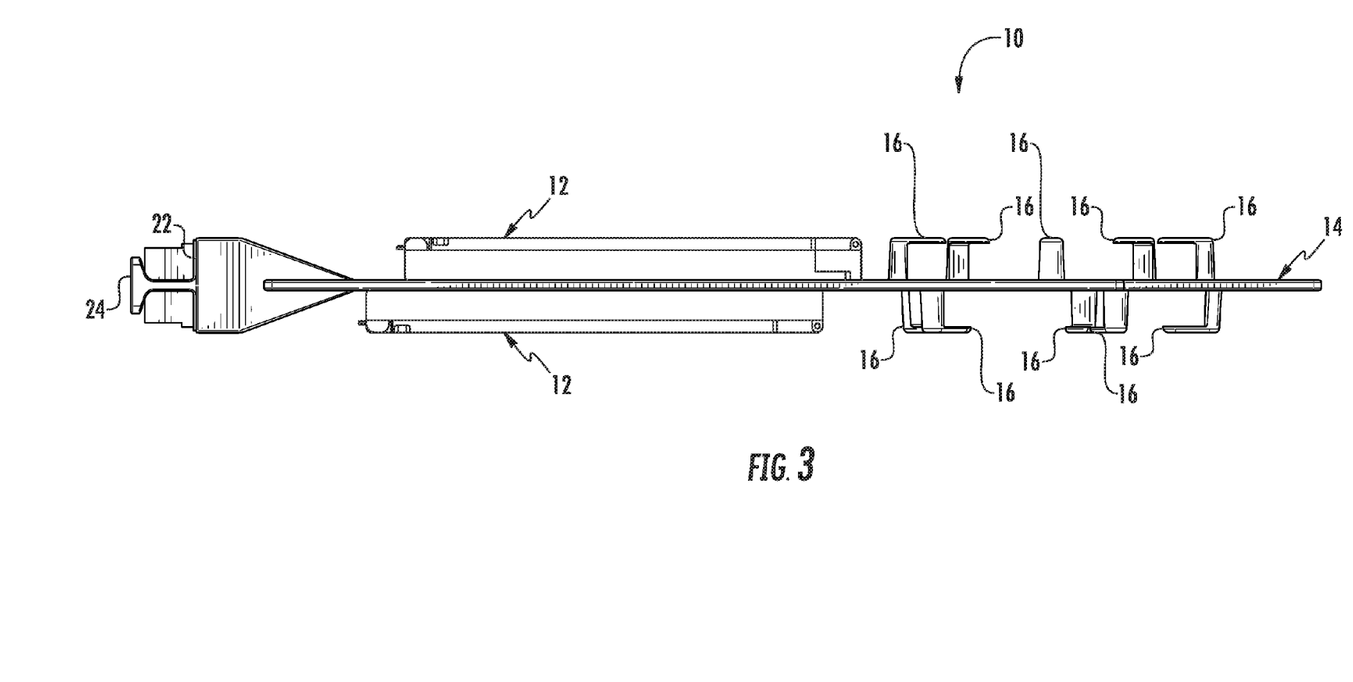
FIG. 3 is a side elevational view of the inline splicing module of the present invention in accordance with one embodiment.
Figure 4:
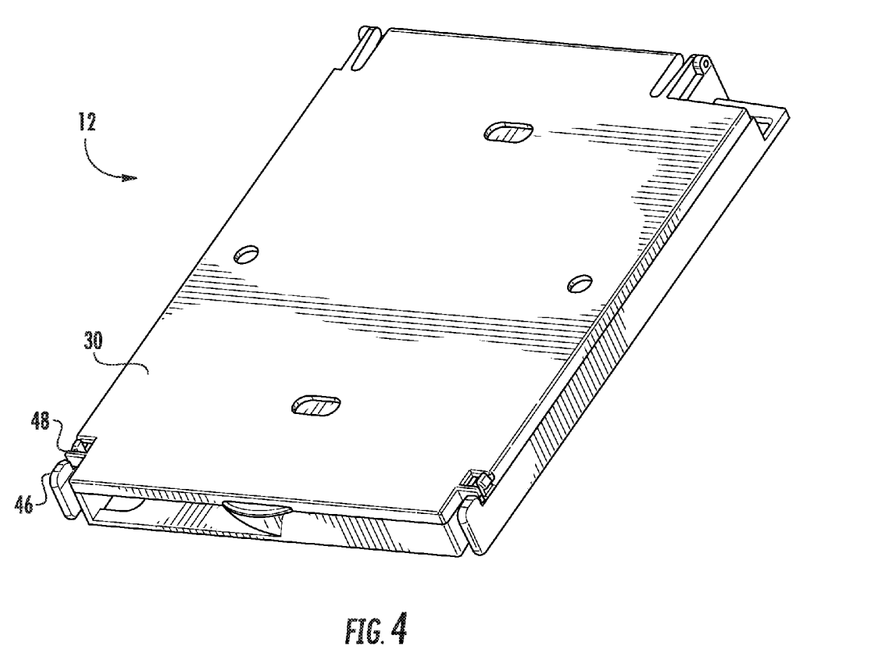
FIG. 4 is a perspective view of the splice tray of the present invention, wherein the splice tray is in the closed configuration.
Figure 5:
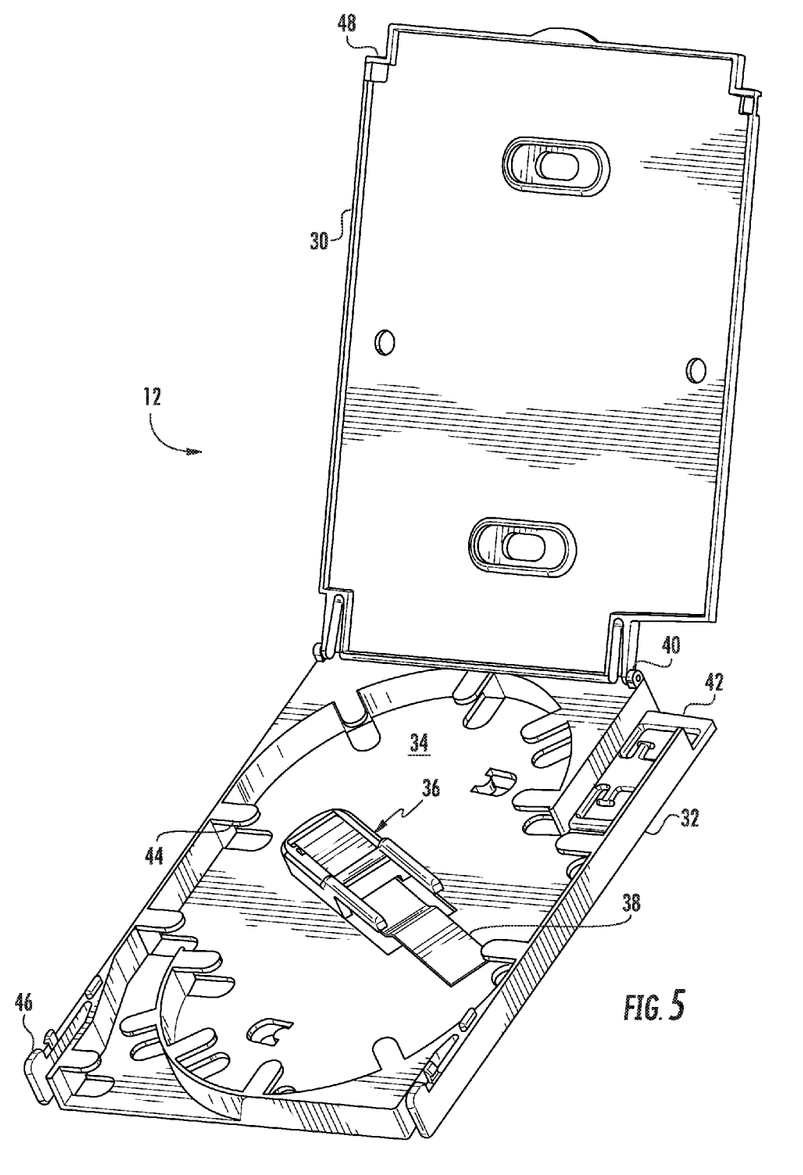
FIG. 5 is a perspective view of the splice tray of the present invention, wherein the splice tray is in the open configuration.
Figure 6:
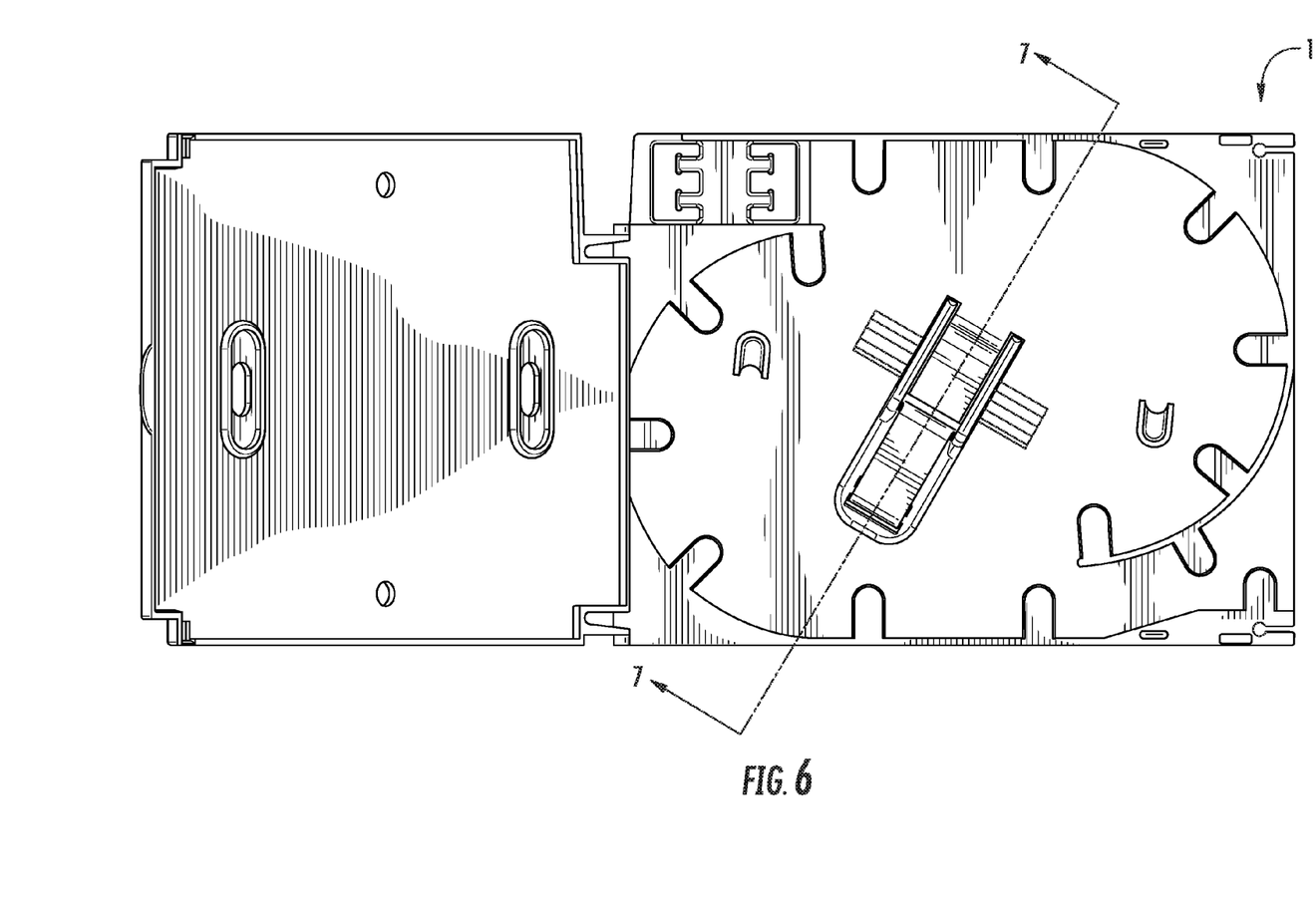
FIG. 6 is a top plan view of the splice tray of the present invention, wherein the splice tray is in the open configuration.

Referring initially to FIGS. 1-3, the inline splicing module 10 includes first and second splice tray cabinets 12 mounted on a backplane component 14. In one embodiment, the backplane component 14 includes top and bottom sides each having a plurality of protrusions 16 defining a cable slack storage component. In a non-limiting embodiment, the protrusions form a ring shape, as illustrated throughout the drawings. The protrusions 16 serve to maintain cable subgroups in a storage position by inhibiting the cable subgroups from bulging outwards during operation of the inline splicing module 10. An opening 18 on the backplane component 14 is provided for facilitating rear extraction of the inline splicing module 10 along railing 60 (see FIG. 9A). A plurality of clips 20 at the rear end of the backplane component 14 permit a variety of entry points and angles for the fiber subgroup cable 64 (see FIG. 10).

Figure 8:
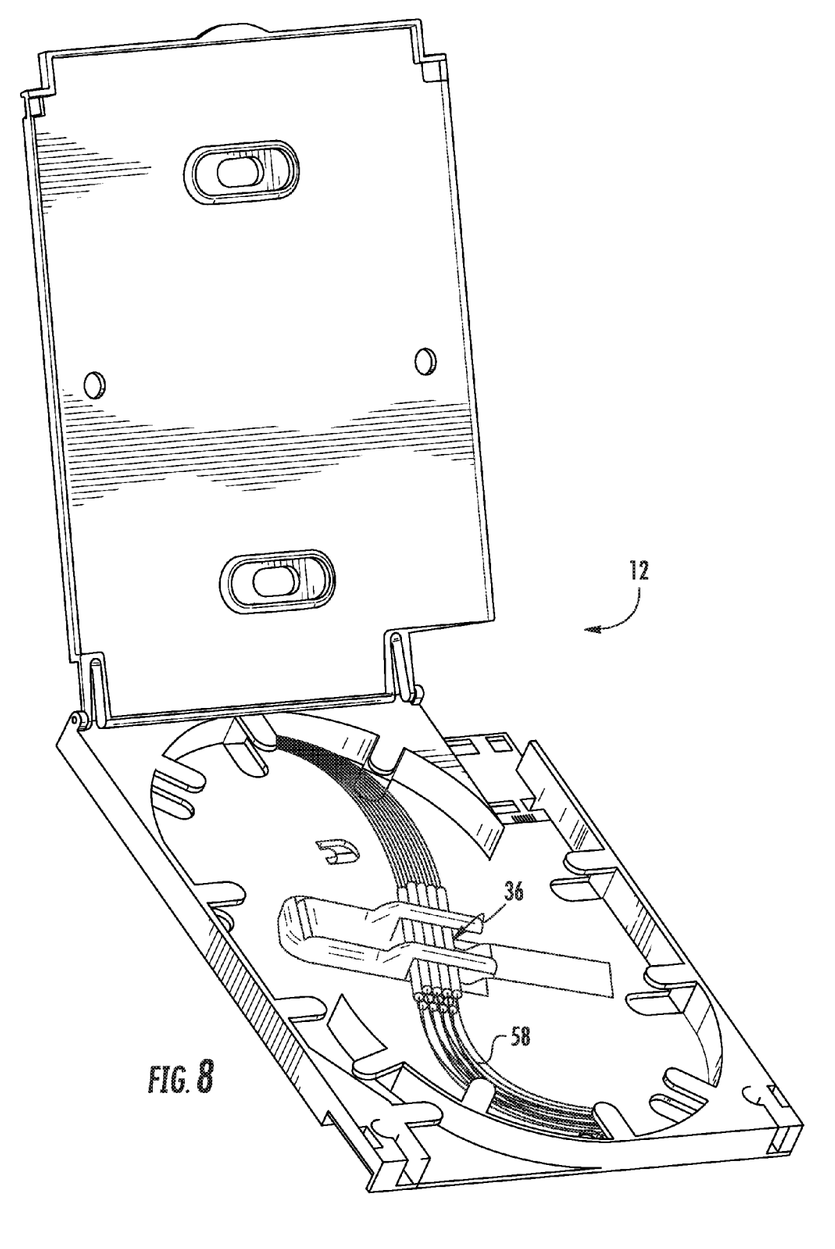
FIG. 8 is a perspective view of the splice tray of the present invention, wherein the splice tray with a plurality of secured individual fibers.

Still referring to FIGS. 1-3, a coupler plate 22 at the front end of the backplane component 14 includes a plurality of fiber optic couplers 28 each being structured and disposed for receipt of a corresponding one of a plurality of individual fibers 58 (see FIG. 8). A front pull extraction pull tab 24 and pin 26 are provided for facilitating replacement of the coupler plate 22, thereby making coupler plates 22 interchangeable with the backplane component 14 for accommodating different couplers 28 that are standard in the industry.

Using LC couplers, a coupler plate 22 can hold six four-port couplers for a total of twenty-four (24) ports. In this configuration, the inline splicing module 10 will include a splice tray cabinet 12 on each side of the backplane component 14. Using SC couplers, the coupler plate 22 can hold six two-port couplers for a total of twelve (12) ports. In this configuration, the inline splicing module 10 will have one splice tray cabinet 12 on one side of the backplane component 14.

Figure 7:
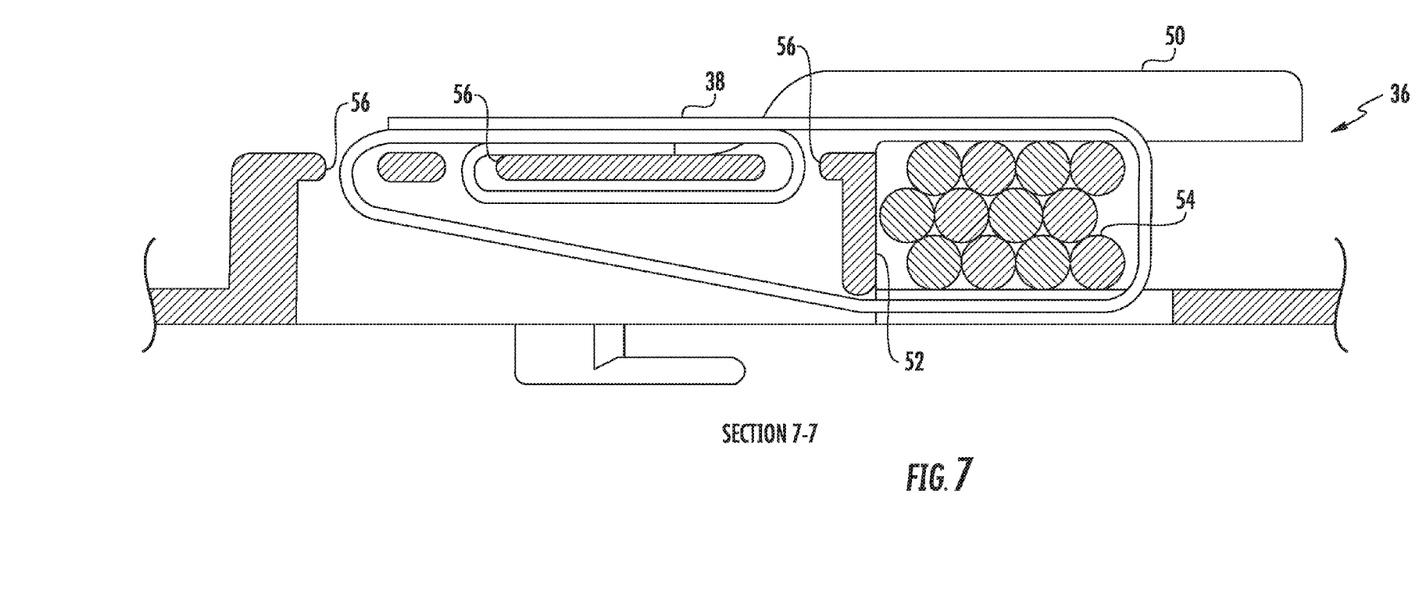
FIG. 7 is a side elevational view of the splice capturing component, shown in cross section, taken from FIG. 6.

Referring to FIGS. 4-8, the splice tray cabinet 12 includes a top cover 30 and main body 32 surrounding an interior chamber 34. A splice capturing component 36 is located in the interior chamber 34 of the splice tray cabinet 12. A fastener 38, such as a hook and loop fastener, is integrated with the splice capturing component 36. Referring specifically to FIG. 7, the splice capturing component 36 includes hold-down bar 50 and back plate 52 which partially encompasses a plurality of splice protector sleeves 54. In one embodiment, the splice protector sleeves 54 are stacked or otherwise tightly grouped together with no gaps in between each other in order to limit the requisite amount of space occupied by the splices. Each splice protector sleeve 54 is sized and configured for securing a corresponding one of the plurality of individual fibers 58 therethrough. In one embodiment, the fastener 38 is fed through a series of slots 56 to capture the splices. In one embodiment, the splice capturing component 36 includes twelve (12) splice protector sleeves 54 in a stacked configuration, such as in a 4×3 stacked configuration.

Still referring to FIGS. 4-8, the top cover 30 of splice tray cabinet 12 is hingedly secured to the main body 32 for operating the cabinet 12 between open and closed configurations. In one embodiment, the hinge 40 is offset, as illustrated throughout the drawings, thereby permitting cable access through passage 42 into the interior chamber 34 when the splice tray cabinet 12 is in the closed configuration. A plurality of overhangs 44 surrounding the interior chamber 34 serve to keep the fibers 58 in place. A depressible tab 46 on the main body 32 and latch 48 on top cover 30 are selectively operable for closing and opening the splice tray cabinet 12.

A pathway is defined by the three main elements of the inline splicing module 10—the cable slack storage component formed by the plurality of protrusions 16, the interior chamber 34 of splice tray cabinet 12, and the fiber optic couplers 28 on the coupler plate 22—on which the cable 64 and individual fibers 58 are securely arranged.

Figure 9A:
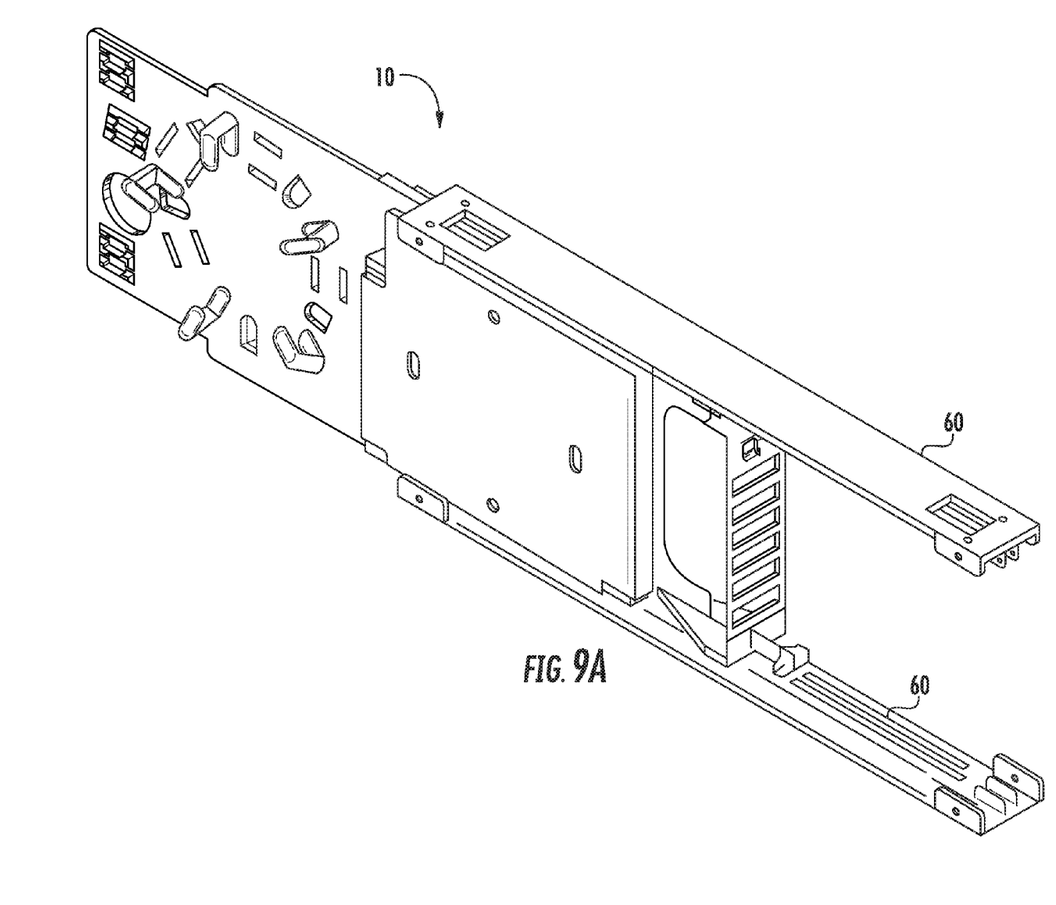
FIGS. 9A and 9B are perspective views of the inline splicing module illustrating rearward and forward movement, respectively, of the inline splicing module along railing.
Figure 9B:
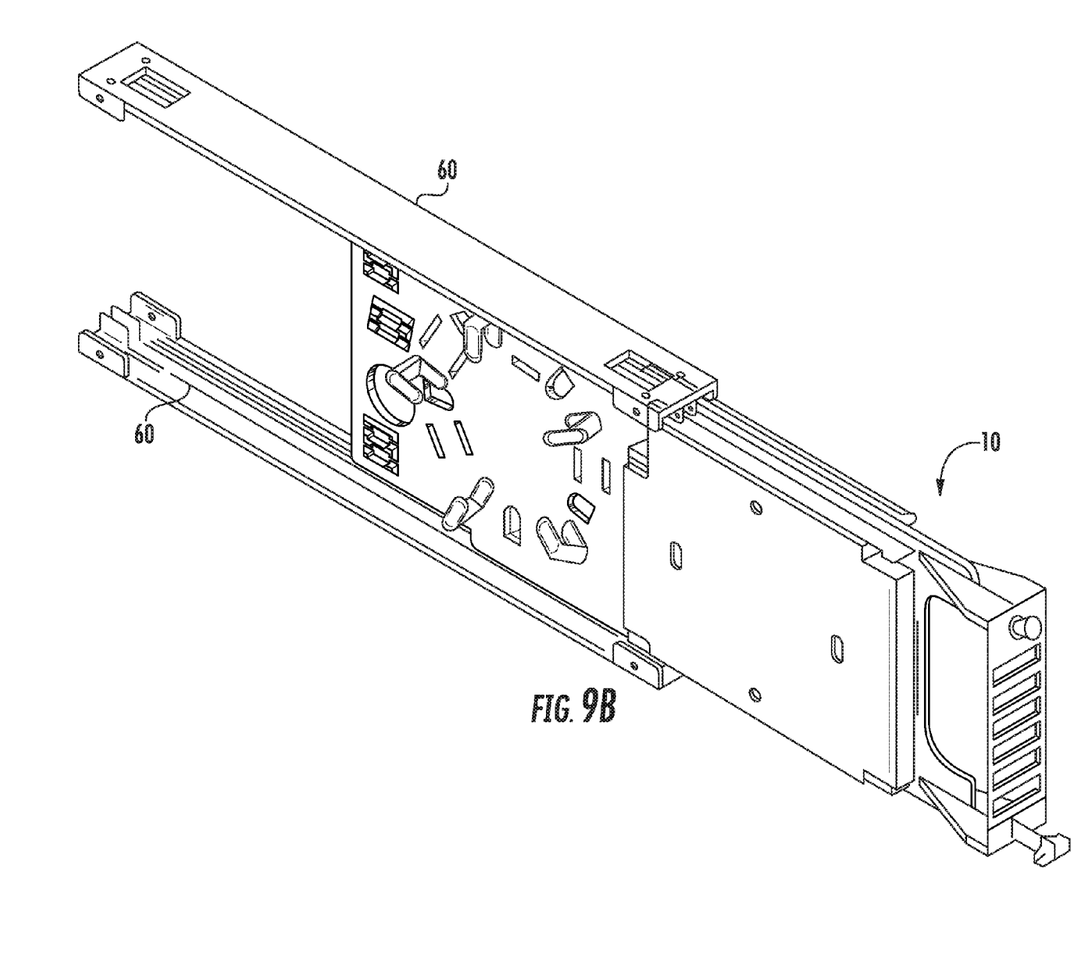
Figure 10:
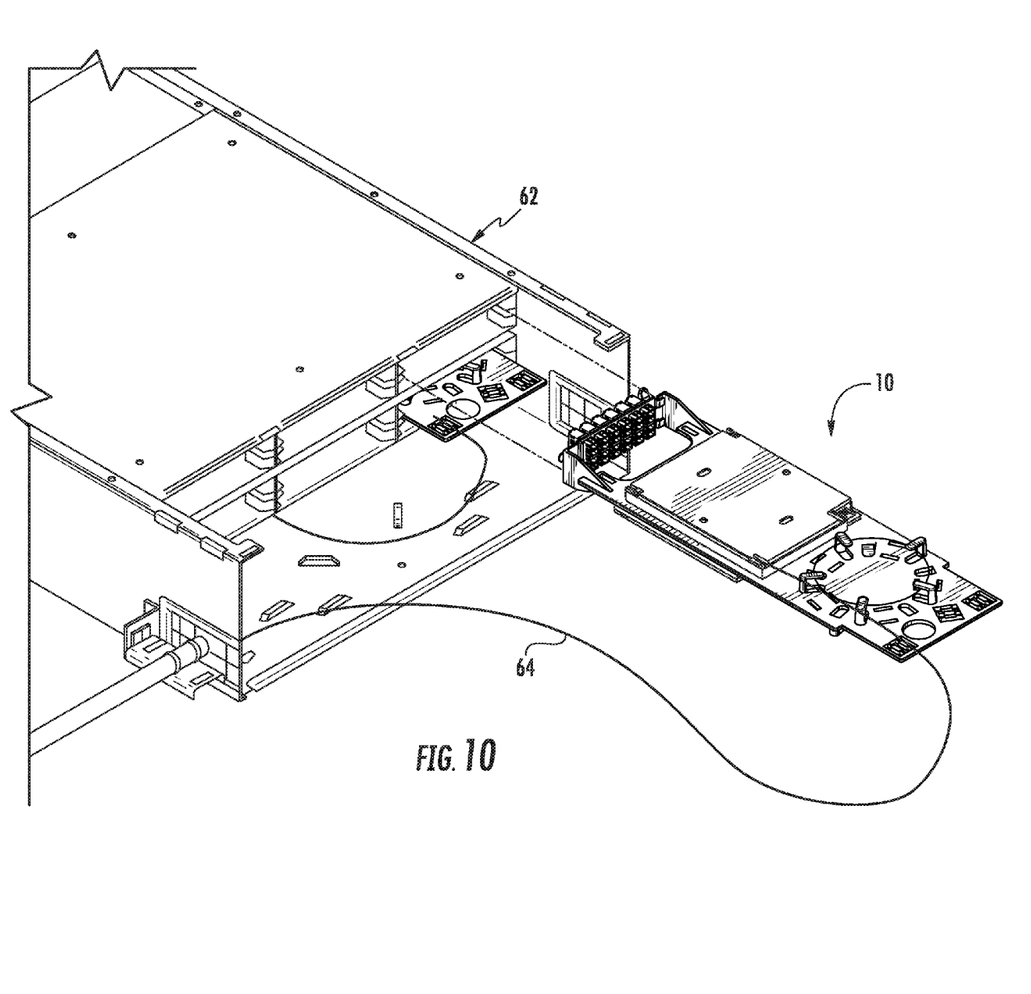
FIG. 10 is a perspective view of the inline splicing module of the present invention in combination with a chassis.

Referring to FIGS. 9A-10, the inline splicing module 10 can be used as part of a variety of different configurations, wherein a plurality of inline splice modules 10 are used in combination (e.g., in stacked or slotted alignment). In a preferred embodiment, each inline splicing module 10 is securable along railing 60, as shown in FIGS. 9A and 9B. The inline splicing module 10 may be partially or entirely extracted along railing 60 via rearward and/or forward movement, as shown in FIGS. 9A and 9B, respectively. Referring specifically to FIG. 10, one configuration is shown wherein a chassis 62 secures a plurality of inline splicing modules 10 along railings in a stacked configuration. Other configurations for arranging the inline splicing module 10 include use of stackable storage hoops and RTC units.

While the present invention has been shown and described in accordance with several preferred and practical embodiments, it is recognized that departures from the instant disclosure are contemplated within the spirit and scope of the present invention which are not limited except as defined in the following claims as interpreted by the Doctrine of Equivalents.

What is claimed is:
1. An inline splicing module for use in combination with one or more fiber subgroup cables each including a plurality of individual fibers, said inline splicing module comprising:
a backplane component having top and bottom sides;
at least one projection on said backplane component defining a cable slack storage component for securing the fiber subgroup cable in a storage position;
at least one splice tray, and said splice tray comprising:
a cabinet structure defining the length and width dimensions of an interior chamber and including a plurality of overhang members along a perimeter edge of said interior chamber for partially storing the plurality of individual fibers, and said cabinet structure being selectively operable between an open configuration and a closed configuration; and
a splice capturing component located within the interior chamber of said cabinet structure at a location central to each of the length and width dimensions of said interior chamber and said splice capturing component comprising:
a plurality of splice protector sleeves that are each sized and configured for securing therethrough a corresponding one of the plurality of individual fibers from one of the one or more fiber subgroup cables;
a hold-down bar and back plate each at least partially encompassing said plurality of splice protector sleeves; and
a plurality of slots formed thereon each being sized and configured for receipt of a fastener for tightly grouping together said plurality of splice protector sleeves;
said backplane component being structured and disposed for selectively securing one of each of said at least one splice trays on each of the top and bottom sides of said backplane component; and
a coupler plate on said backplane component including a plurality of fiber optic couplers each being structured and disposed for receipt of a corresponding one of the plurality of individual fibers.

2. The inline splicing module as recited in claim 1 wherein said at least one projection comprises a plurality of projections forming a hoop structure and defining the cable slack storage component.

3. The inline splicing module as recited in claim 1 wherein said coupler plate is selectively interchangeable.

4. The inline splicing module as recited in claim 1 wherein said cabinet structure includes a top cover and a main body, together defining an interior chamber, and said top cover being secured to said main body by a hinge for selectively operating said cabinet structure between an open configuration and a closed configuration.

5. The inline splicing module as recited in claim 4 wherein said hinge is an offset hinge, thereby permitting cable access through a passage into the interior chamber when said cabinet structure is in the closed configuration.

6. The inline splicing module as recited in claim 1 wherein said splice capturing component includes twelve splice protector sleeves.

7. The inline splicing module as recited in claim 1 wherein said plurality of splice protector sleeves are stacked.

8. An inline splicing module for use in combination with one or more fiber subgroup cables each including a plurality of individual fibers, said inline splicing module comprising:
   a backplane component having top and bottom sides;
   at least one projection on said backplane component defining a cable slack storage component for securing the fiber subgroup cable in a storage position;
   at least one splice tray having a plurality of overhangs defining the perimeter of said at least one splice tray and said at least one splice tray including a splice capturing component being centrally located within the perimeter on said at least one splice tray and having a hold-down bar configured to secure thereunder a plurality of splice protector sleeves that are each sized and configured for securing therethrough a corresponding one of the plurality of individual fibers from one of the one or more fiber subgroup cables, wherein said plurality of splice protector sleeves are tightly grouped together by a fastener fed through a plurality of slots formed by said splice capturing component, and wherein the exposed portions of the plurality of individual fibers on opposing sides of said plurality of splice protector sleeves are aligned for partial storage beneath said plurality of overhangs;
   said backplane component being structured and disposed for selectively securing one of each of said at least one splice trays on each of the top and bottom sides of said backplane component; and
   a coupler plate on said backplane component including a plurality of fiber optic couplers each being structured and disposed for receipt of a corresponding one of the plurality of individual fibers.

9. The inline splicing module as recited in claim 8 wherein said at least one projection comprises a plurality of projections forming a hoop structure and defining the cable slack storage component.

10. The inline splicing module as recited in claim 8 wherein said coupler plate is selectively interchangeable.

11. The inline splicing module as recited in claim 8 wherein said splice capturing component includes twelve splice protector sleeves.

12. The inline splicing module as recited in claim 8 wherein said plurality of splice protector sleeves are stacked.

13. An inline splicing module for use in combination with one or more fiber subgroup cables each including a plurality of individual fibers, said inline splicing module comprising:
   a backplane component having top and bottom sides;
   at least one projection on said backplane component defining a cable slack storage component for securing the fiber subgroup cable in a storage position;
   a plurality of overhangs defining a perimeter storage area on said backplane component;
   at least one splice capturing component that is centrally located within said perimeter storage area on said backplane component having a plurality of splice protector sleeves that are each sized and configured for securing therethrough a corresponding one of the plurality of individual fibers from one of the one or more fiber subgroup cables;
   a hold-down bar that is configured to secure thereunder said plurality of splice protector sleeves; and
   a plurality of fiber optic couplers each being structured and disposed for receipt of a corresponding one of the plurality of individual fibers.

14. The inline splicing module as recited in claim 13 wherein said at least one projection comprises a plurality of projections forming a hoop structure and defining the cable slack storage component.

15. The inline splicing module as recited in claim 13 wherein said coupler plate is selectively interchangeable.

16. The inline splicing module as recited in claim 13 wherein said splice capturing component includes twelve splice protector sleeves.

17. The inline splicing module as recited in claim 13 wherein said plurality of splice protector sleeves are stacked.

* * * * *